(12) United States Patent
Lin et al.

(10) Patent No.: US 10,515,444 B2
(45) Date of Patent: Dec. 24, 2019

(54) CARE AREA GENERATION FOR INSPECTING INTEGRATED CIRCUITS

(71) Applicant: Dongfang Jingyuan Electron Limited, Beijing (CN)

(72) Inventors: Jie Lin, San Jose, CA (US); Zhaoli Zhang, San Jose, CA (US)

(73) Assignee: Dongfang Jingyuan Electron Limited, Beijing (CN)

( * ) Notice: Subject to any disclaimer, the term of this patent is extended or adjusted under 35 U.S.C. 154(b) by 72 days.

(21) Appl. No.: 15/419,650

(22) Filed: Jan. 30, 2017

(65) Prior Publication Data

US 2018/0218490 A1 Aug. 2, 2018

(51) Int. Cl.
*G06T 7/00* (2017.01)

(52) U.S. Cl.
CPC .. *G06T 7/0004* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 2007/0230770 A1* | 10/2007 | Kulkarni | G06F 17/5045 382/149 |
| 2007/0288219 A1* | 12/2007 | Zafar | G03F 1/84 703/14 |
| 2009/0272899 A1 | 11/2009 | Yamazaki et al. | |
| 2012/0098954 A1 | 4/2012 | Yamaguchi et al. | |
| 2012/0245861 A1* | 9/2012 | Greene | H01L 22/12 702/40 |
| 2015/0154746 A1 | 6/2015 | Zafar et al. | |
| 2017/0352145 A1* | 12/2017 | Dhagat | G02B 21/0016 |

FOREIGN PATENT DOCUMENTS

| | | |
|---|---|---|
| JP | 2004233163 A | 8/2004 |
| JP | 2014211955 A | 11/2014 |

OTHER PUBLICATIONS

HackerEarth , "Shortest Path Algorithms", Jun. 22, 2017.*
International Search Report dated Feb. 27, 2018 from corresponding PCT Application No. PCT/US2017/059032.

* cited by examiner

*Primary Examiner* — Jiangeng Sun
(74) *Attorney, Agent, or Firm* — Young Basile Hanlon & MacFarlane, P.C.

(57) ABSTRACT

Methods and systems for inspecting integrated circuits are provided. The method includes generating care areas that each includes at least one potential defect, organizing the generated care areas based on a first set of spatial relationships to provide a list of neighboring care areas, wherein each neighboring care area is an entry within the list, and generating a recipe file of the list, wherein each neighboring care area is inspected sequentially using a high-resolution inspection system. The system comprises a memory including instructions executable by a processor to: generate care areas that each includes at least one potential defect, organize the generated care areas based on a first set of spatial relationships to provide a list of neighboring care areas that are each an entry within the list, and generate a recipe file of the list, wherein each neighboring care area is inspected sequentially using a high-resolution inspection system.

12 Claims, 8 Drawing Sheets

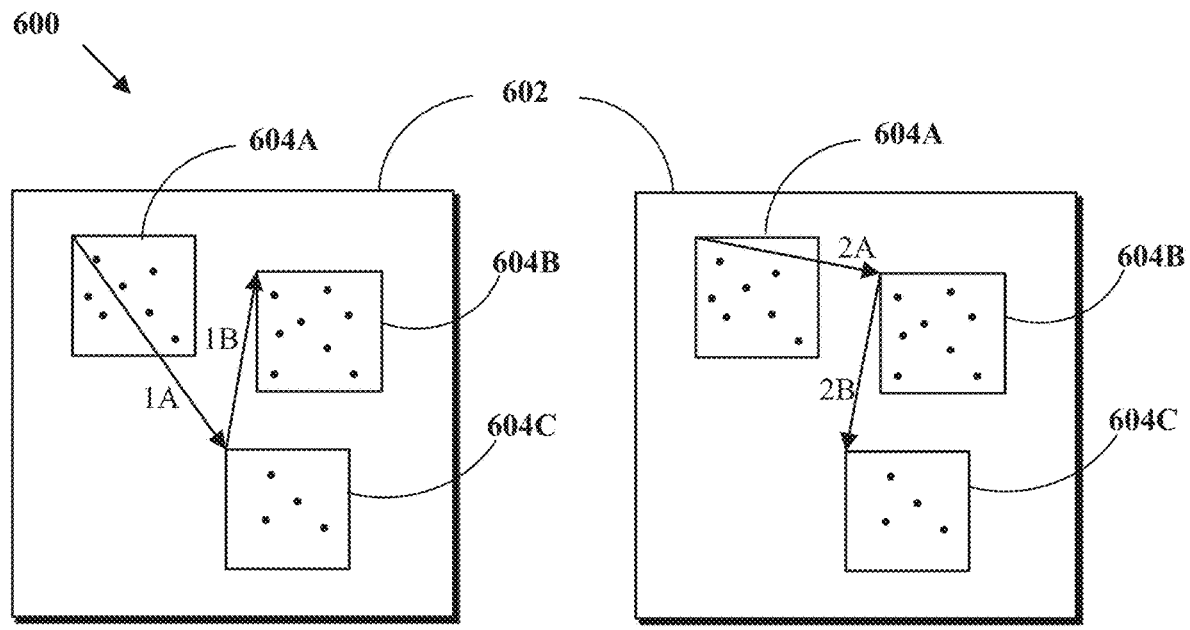
FIG. 6A  FIG. 6B
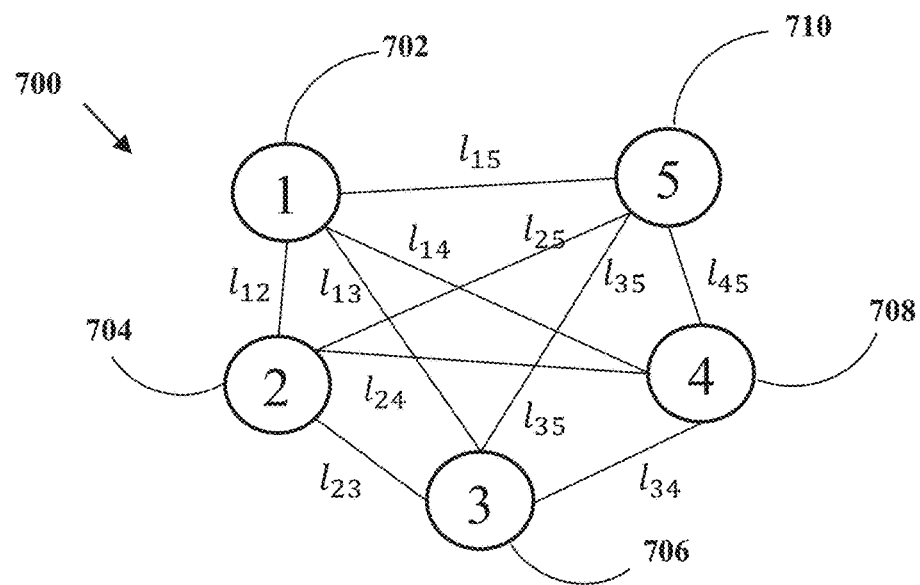
FIG. 7

CARE AREA GENERATION FOR INSPECTING INTEGRATED CIRCUITS

TECHNICAL FIELD

This disclosure relates generally to inspecting integrated circuits fabricated on wafers, and more specifically, to generating care areas for inspecting the integrated circuits.

BACKGROUND

The manufacture of microchip devices is a multi-step process carried out on a substrate such as a wafer. Multiple integrated circuits (ICs) are typically produced on a wafer. Each IC is known as a die. Die inspection is one step of the manufacturing process. Inspection systems can detect defects that occur during the manufacturing process. Optical wafer inspection systems have been conventionally used for wafer and/or die inspection.

SUMMARY

Disclosed herein are aspects, features, elements, and implementations of methods and systems for generating care areas for inspecting integrated circuits.

In a first aspect, a method for inspecting integrated circuits is provided. The method includes generating care areas that each includes at least one potential defect, organizing the generated care areas based on a first set of spatial relationships to provide a list of neighboring care areas, wherein each neighboring care area is an entry within the list, and generating a recipe file of the list, wherein each neighboring care area is inspected sequentially using a high-resolution inspection system.

In a second aspect, a system for inspecting integrated circuits is provided including a processor and a memory coupled to the processor. The memory includes instructions executable by the processor to generate care areas that each includes at least one potential defect, organize the generated care areas based on a first set of spatial relationships to provide a list of neighboring care areas, wherein each neighboring care area is an entry within the list, and generate a recipe file of the list, wherein each neighboring care area is inspected sequentially using a high-resolution inspection system.

In a third aspect, a non-transitory computer readable storage medium for inspecting integrated circuits is provided including executable instructions that, when executed by a processor, facilitate performance of operations. The operations include generating care areas that each includes at least one potential defect, organizing the generated care areas based on a first set of spatial relationships to provide a list of neighboring care areas, wherein each neighboring care area is an entry within the list, and generating a recipe file of the list, wherein each neighboring care area is inspected sequentially using a high-resolution inspection system.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

FIGS. 6A-6B are an example of a technique for determining a path between fields of view according to implementations of this disclosure.

FIG. 7 is an example of a technique for determining a shortest path between fields of view according to implementations of this disclosure.

DETAILED DESCRIPTION

Figure 1:
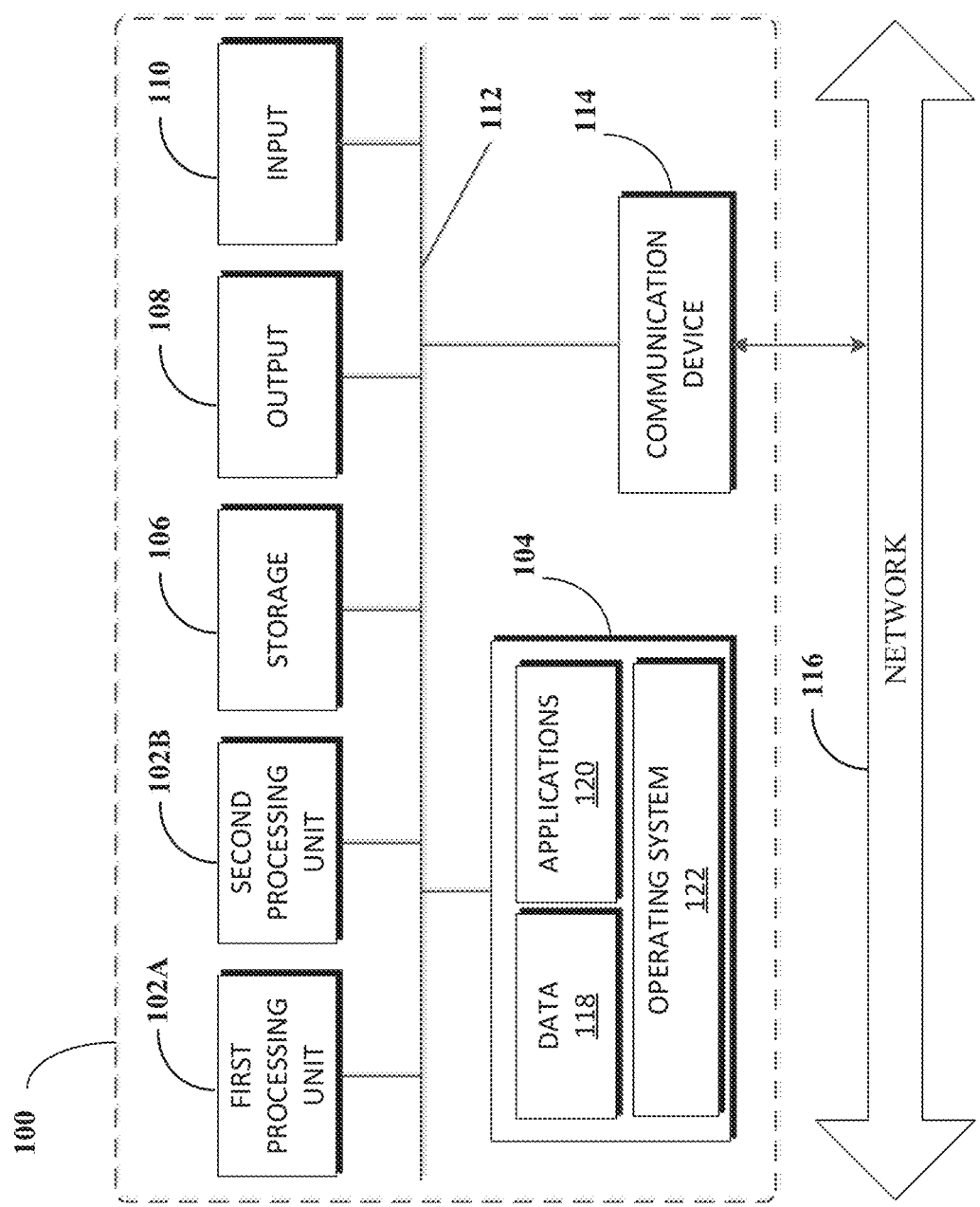
FIG. 1 is a block diagram of an example system used for generating and optimizing care areas according to implementations of this disclosure.

The manufacture of microchip devices continually strives for smaller sized elements to achieve higher density for integrated circuit (IC) designs on a target wafer. A wafer, also referred to as a substrate, is a thin slice of semiconductor material used for the fabrication of integrated circuits. For example, demand for 10 nanometer (nm) resolution and beyond now exists for features of logic circuits and arrays (e.g., finFETs, DRAMs, 3D NAND, etc.) in microchip semiconductor fabrication. The process of manufacturing integrated circuits (ICs) involves several phases, including a design phase, a manufacturing phase, and an inspection phase. During the inspection phase, ICs manufactured during the manufacturing phase are inspected for potential defects. The results of the inspection can be used to improve or adjust the design, the manufacturing, and the inspection phases, and any combination thereof.

Detecting defects in such devices and/or defects of small sizes is a challenge in semiconductor manufacturing facilities. Conventional high throughput inspection systems (e.g., optical inspection systems) lack, for example, the resolution to find defects (e.g., physical defects) in manufactured devices. As such, optical inspection systems are not suitable for detecting defects with sizes below their optical resolutions. On the other hand, high resolution inspection systems, such as electron beam (e-beam or EBeam) systems, can detect such defects. However, e-beam systems have low throughput. As such, the applicability and suitability of e-beam systems for production line (or inline) defect inspection of integrated circuits has been limited. For example, one week or more may be required to fully scan a single integrated circuit or die using an e-beam system. As such, e-beam systems have conventionally been used during the IC design process or in an off-line inspection and review process and not in inline production systems.

Inspecting an area of a wafer with an e-beam system typically includes beam deflection operations or stage movement operations. In this disclosure, "wafer" can refer to a wafer, a reticle, or any specimen to be inspected. A stage movement operation is a mechanical operation which takes a non-negligible amount of time. Stage movement operations move the wafer along, for example, a serpentine path under the e-beam system. Each stage movement places (e.g., for scanning) an area of the wafer in the view of the e-beam system. The size of a wafer that the e-beam system can scan without another stage movement is known as the field of view (FOV) of the e-beam system. To scan sub-areas in the FOV, the e-beam system can perform beam deflection operations along the X or Y axes in order to focus the beam of the e-beam system on the sub-area. In certain extreme cases, the e-beam system can spend more time in stage movement than in performing scanning and imaging. Therefore, it is desirable to minimize the number of stage movement operations of the e-beam system.

Additionally, it is desired to control both beam deflections and stage movements to within a predetermined tolerance that is measured in nanometers. As stage movements are a type of mechanical movement, it can be difficult to control the stage movements to low tolerance levels. Stage movements can also cause a disturbance to the electron beam column of the high-resolution inspection or e-beam system thereby affecting its accuracy. For this additional reason, it is desirable to minimize the number of stage movement operations of the high-resolution inspection system.

The areas of a wafer or a die to be inspected by an e-beam system are typically specified in a recipe file. A recipe file can include multiple care areas and each care area is an area of a wafer under inspection that is suspected of containing at least one defect. Care areas can be generated using predicted hot spots or potential defects. A recipe file contains, inter alia, coordinates of the care areas. The e-beam system typically moves from one care area to the next in the order specified in recipe file during the inspection process. If the next care area to be inspected is within the e-beam system's field of view (FOV), then a beam deflection operation is performed in order to scan the next scan area. If the next care area is not within the FOV, then a stage movement operation is performed which decreases efficiency and accuracy.

To minimize stage movement operations, it is desirable to organize the potential defects into an optimal number of care areas, to organize the optimized care areas into an optimal number of fields of views (FOVs), and to optimize a path of inspection between the FOVs. A path between the FOVs determines the order of inspection of the FOVs and can minimize the amount of stage movement even when it cannot be completely avoided.

The present disclosure provides new methods and systems for generating care areas during the inspection of integrated circuits. The present disclosure provides for the generation of care areas that include potential defects and then organizing the generated care areas based on spatial relationships between the care areas. The organized care areas are then written to a recipe file that is utilized during the inspection by a high-resolution inspection system. More specifically, potential defects that need to be inspected are listed and the spatial relationships (and associated signatures) between the list of potential defects are analyzed to optimize care area sizes and positions and to output a list of care areas. The spatial relationships (and associated signatures) between the list of care areas are analyzed to optimize a number of fields of view (FOVs) that cover all the care areas and to output a list of FOVs. The spatial relationships (and associated signatures) between the list of FOVs are analyzed to optimize an order of the FOVs and to write the order to a recipe file.

Implementations of this disclosure provide technological improvements to semiconductor manufacturing processes and computer systems, for example, those computer systems concerning the inspection of manufactured or fabricated semiconductor integrated circuits (ICs). For example, the present disclosure provides for minimizing stage movements of a high-resolution inspection system (e.g., an e-beam system) utilized in the inspection of ICs by optimizing the recipe file utilized during the inspection using the spatial relationships between the potential defects, care areas, and FOVs. Implementations of this disclosure can thus introduce new and efficient improvements in the ways in which integrated circuits are inspected for defects.

While the disclosure has been described in connection with certain embodiments and implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

To describe some implementations in greater detail, reference is made to the following figures.

FIG. 1 is a block diagram of a system 100 used for generating and optimizing care areas according to implementations of this disclosure. The system 100 can be used for care area generation for charged particle beam inspection according to implementations of this disclosure. The system 100 can include an apparatus such as a computing device, which can be implemented by any configuration of one or more computers, such as a microcomputer, a mainframe computer, a super computer, a general-purpose computer, a special-purpose/dedicated computer, an integrated computer, a database computer, a remote server computer, a personal computer, or a computing service provided by a computing service provider, e.g., a web host, or a cloud service provider. In some implementations, the computing device can be implemented in the form of multiple groups of computers that are at different geographic locations and can or cannot communicate with one another, such as by way of a network. While certain operations can be shared by multiple computers, in some implementations, different computers are assigned different operations.

The system 100 can have an internal configuration of hardware including a first processing unit 102A, a second processing unit 102B, and a memory 104. The first processing unit 102A can include at least one processing unit such as a central processing unit (CPU) or any other type of device, or multiple devices, capable of manipulating or processing information now-existing or hereafter developed. The second processing unit 102B can include at least one graphics processing unit (GPU). Although the examples herein can be practiced with a single processing unit as shown, advantages in speed and efficiency can be achieved using more than one processing unit. For example, the first processing unit 102A and the second processing unit 102B can be distributed across multiple machines or devices (each machine or device having one or more of processing units) that can be coupled directly or across a local area or other network. The memory 104 can be a random access memory device (RAM), a read-only memory device (ROM), an optical disc, a magnetic disc, or any other suitable type of storage device. In some implementations, the memory 104 can be distributed across multiple machines or devices such as network-based memory or memory in multiple machines performing operations that can be described herein as being performed using a single computer or computing device for ease of explanation. In some implementations, the memory 104 can store codes and data that can be accessed by the first processing unit 102A and the second processing unit 102B using a bus 112. For example, the memory 104 can include data 118 that can be accessed by the first processing unit 102A and the second processing unit 102B using the bus 112.

The memory 104 can also include an operating system 122 and installed applications 120, applications 120 including programs that permit the first processing unit 102A and the second processing unit 102B to implement instructions to generate control signals for performing functions of generating and optimizing care areas associated with inspecting integrated circuits using an electron beam as described herein. The system 100 can also include a secondary, additional storage 106, for example, a memory card, a flash drive, an external hard drive, an optical drive, or any other form of computer readable medium. In some implementations, the applications 120 can be stored in a whole or in part in the storage 106 and loaded into the memory 104 as needed for processing.

The system 100 can include one or more output devices, such as an output 108. The output 108 can be implemented in various ways, for example, it can be a display that can be coupled to the system 100 and configured to display a rendering of video data. The output 108 can be any device transmitting a visual, acoustic, or tactile signal to the user, such as a display, a touch sensitive device (e.g., a touch screen), a speaker, an earphone, a light-emitting diode (LED) indicator, or a vibration motor. If the output 108 is a display, for example, it can be a liquid crystal display (LCD), a cathode-ray tube (CRT), or any other output device capable of providing visible output to an individual. In some cases, an output device can also function as an input device—a touch screen display configured to receive touch-based input, for example.

The output 108 can alternatively or additionally be formed of a communication device for transmitting signals and/or data. For example, the output 108 can include a wired mean for transmitting signals or data from the system 100 to another device. For another example, the output 108 can include a wireless transmitter using a protocol compatible with a wireless receiver to transmit signals from the system 100 to another device.

The system 100 can include one or more input devices, such as an input 110. The input 110 can be implemented in various ways, such as a keyboard, a numerical keypad, a mouse, a microphone, a touch sensitive device (e.g., a touch screen), a sensor, or a gesture-sensitive input device. Any other type of input device, including an input device not requiring user intervention, is possible. For example, the input 110 can be a communication device such as a wireless receiver operating according to any wireless protocol for receiving signals. The input 110 can output signals or data, indicative of the inputs, to the system 100, e.g., along the bus 112.

Optionally, the system 100 can be in communication with another device using a communication device, such as a communication device 114, via a network, such as a network 116. The network 116 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks and the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the system 100 using the bus 112 to provide functions of communication with the network 116.

The system 100 can communicate with a wafer or reticle inspection equipment. For example, the system 100 can be coupled to one or more wafer or reticle inspection equipment, such as an e-beam system or an optical system, configured to generate wafer or reticle inspection results.

The system 100 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of system 100 do not necessarily have to be implemented in the same manner.

In some implementations, the system 100 can be implemented using general purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

Figure 2:
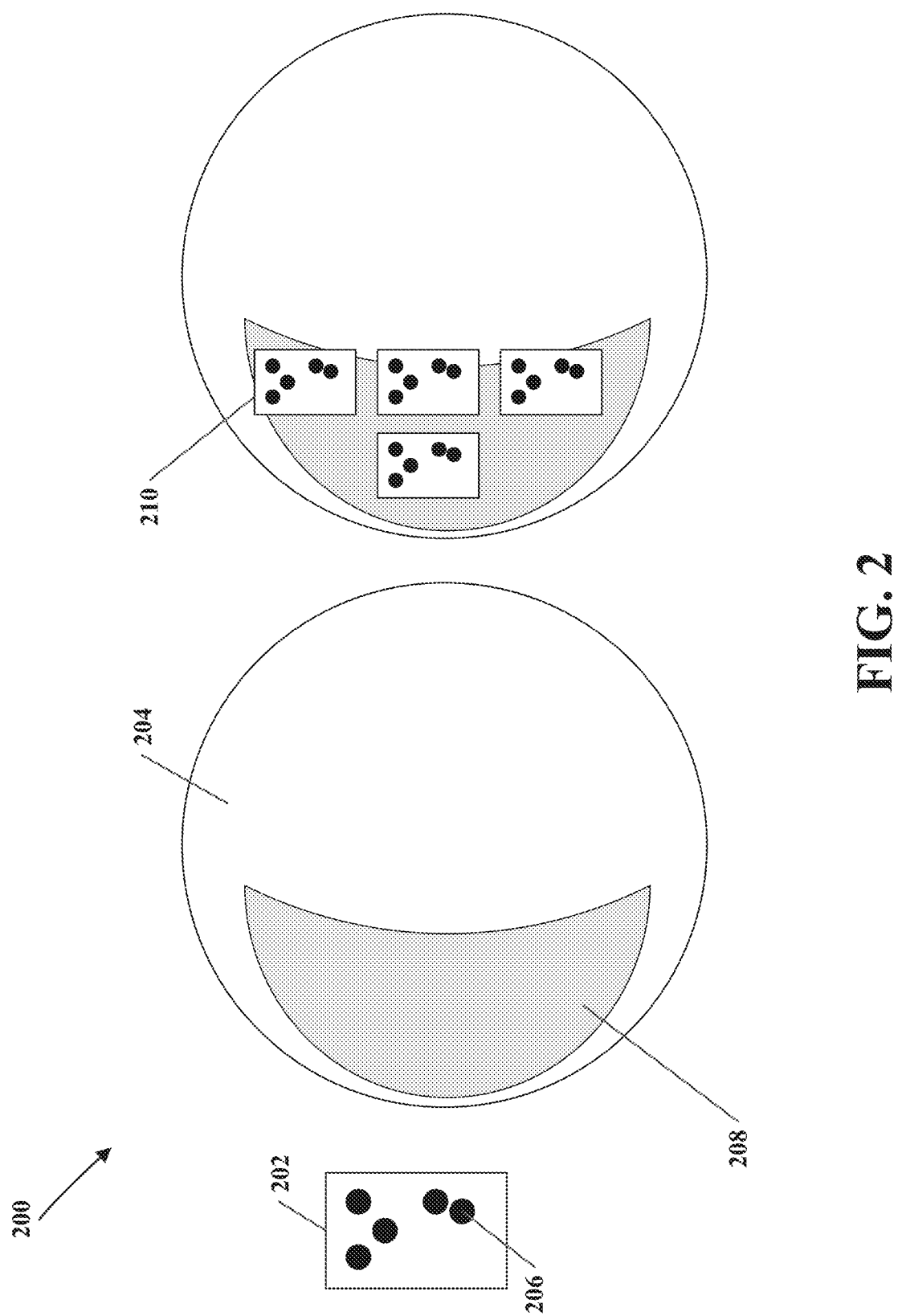
FIG. 2 is an example of an operation for defect inspection according to implementations of this disclosure.

FIG. 2 is an example of an operation 200 for defect inspection according to implementations of this disclosure. The operation 200 illustrates a manufacturing process and/or design process of an integrated circuit 202 (e.g., a die). The integrated circuit 202 is analyzed during the operation 200 to determine hot spots 206 (i.e., black circles on the integrated circuit 202 of FIG. 2). A hot spot relates to a design pattern which, when manufactured under undesirable or unexpected manufacturing process conditions (i.e., process condition variations or process variability), can render a die inoperable or result in an actual defect within the die that affects the overall performance of the die. Undesirable or unexpected manufacturing process conditions are manufacturing conditions that deviate from the ideal process conditions. ICs manufactured under ideal process conditions exhibit minimal or no defects.

In the operation 200, a wafer 204 under inspection by an inspection process is scanned by a high-resolution system including but not limited to an electron beam (e-beam) system to obtain or provide a process condition variation map. The process condition variation map is obtained by scanning the wafer 204 for certain pre-designed or pre-selected patterns and analyzing the high-resolution images via a set of computer instructions. The pre-designed or pre-selected patterns are IC design patterns which are suspected to be sensitive to process condition variations. In other words, the shapes of the pre-designed or pre-selected patterns on the wafer can change substantially when the manufacturing process experiences variations from ideal conditions. The pre-designed or pre-selected patterns can be selected based on prior knowledge (from information of an operator, information stored in a database, or information extracted using machine learning techniques) that the areas are sensitive to process condition variations. The pre-designed or pre-selected patterns can also be selected based on the chip designs of the integrated circuits being manufactured and inspected. Metrology or measurement results from these pre-designed or pre-selected patterns, obtained with an e-beam system, are then converted to process condition parameters. The process condition parameters can be used to generate one or more process condition variation maps. A process condition variation map indicates how different parts of a wafer may be affected by variations in the process conditions (e.g., variation in focus or dose). Variations in process conditions can result in defects in the manufactured dies.

In the operation 200, a process condition variation map reveals that an area 208 of the wafer 204 exhibits significant process condition variations. In another implementation, the area 208 represents the process condition variation map (and not just a subset of the process condition variation map) that has been determined via the operation 200. As such, the inspection process of the operation 200 only inspects certain dies (such as a die 210) of the wafer 204 for defects which is more efficient and less time-consuming than an inspection process that inspects the entire area of the wafer 204. The dies to be inspected for defects are those dies which are included in, or overlap with, the area 208. In another implementation, the dies that are inspected include dies that are within a predetermined area or distance of the area 208 even if they don't overlap with or are not enclosed within the area 208.

The hot spots of such dies may be determined upon further inspection to be true actual defects. Whether any of the hot spots of the die 210 is a true defect is determined by an inspection (e.g., additional scanning by the e-beam system). The hot spots of dies that are outside of, or not overlapping, the area 208 are not expected to result in actual defects and, therefore, do not have to be inspected. As described below, inspecting a hot spot means inspecting a care area that contains the hot spot. In an implementation, only care areas overlapping the area 208 are inspected. That is, instead of inspecting all the care areas of a die that is included in, or overlaps, the area 208, only the care areas inside the area 208 of those dies are inspected. While the area 208 is illustratively shown as a continuous area, this need not be the case. The shape of area 208 is not so limited and for example, can comprise various shapes separated by gaps or spaces.

In an implementation, the hot spots are assigned severity levels based upon various factors including but not limited to design features and the purpose or usage of the integrated circuits. The hot spots that are determined to have a high severity level and are thus deemed to be more important than hot spots with lower severity levels (e.g., hot spots that have high severity levels because they are near critical areas of the integrated circuit) are also scanned even if they do not fall within or overlap with the area 208. In other words, if dies that fall outside of the process condition variation map include hot spots that have been determined to have a high severity (e.g., a severity level that is greater than a predetermined threshold severity value) or importance level, they can also be scanned for actual defects.

As illustrated by the operation 200, an inspection method and system in accordance with the present disclosure and operation 200 significantly reduce wafer regions and dies to be inspected by a high-resolution inspection or e-beam system. Consequently, the time and cost required to inspect a manufactured wafer and the associated integrated circuits or dies is reduced and a low throughput, high resolution, e-beam scanning machine or device can be used for inline inspection of the semiconductor manufacturing process.

Figure 3:
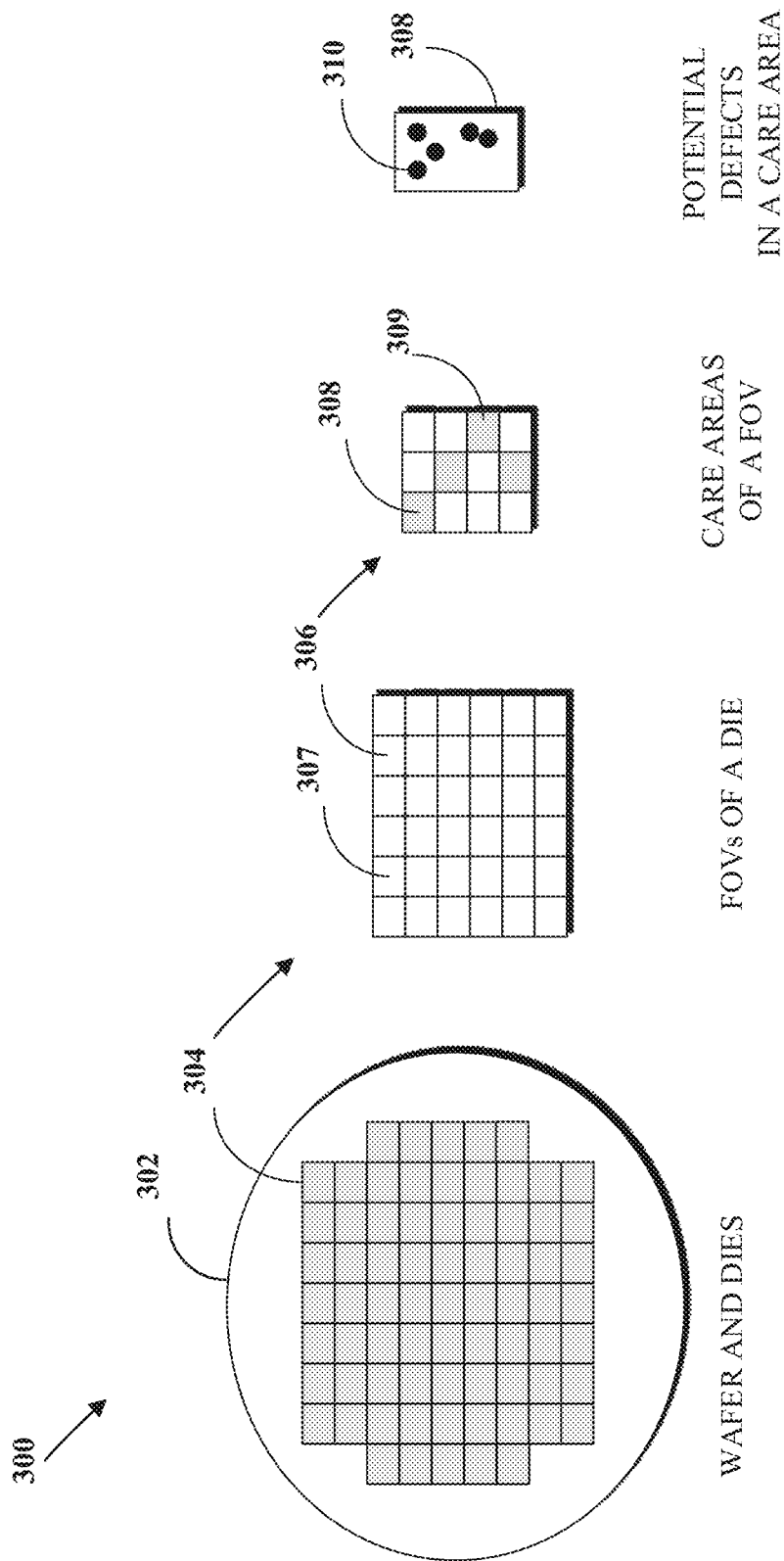
FIG. 3 is an example of a technique for generating care areas according to implementations of this disclosure.

FIG. 3 is an example of a technique 300 for generating care areas according to implementations of this disclosure. The technique 300 includes a wafer 302 that can include multiple integrated circuits or dies. One such die is die 304. While seventy-three dies are depicted in the wafer 302 of FIG. 3, the wafer 302 can include any number of dies depending on the wafer size and the design of the die. The field of view (FOV) of an e-beam system can be smaller than the size of a die. As such, to inspect a die or an area therein, the die can be divided into multiple FOVs, such as FOVs 306, 307. While thirty-six FOVs are depicted in the die 304 of FIG. 3, the die 304 can include any number of FOVs depending on the capabilities of the e-beam system and inspection resolution. Upon completing inspection of a care area, such as a care area 308, within the FOV 306, a stage movement operation, switching the e-beam system from the FOV 306 to the FOV 307, is required before the e-beam system can scan an area within the FOV 307.

A FOV including the FOVs 306, 307 can be further divided into multiple areas. Areas containing potential defects are herein called care areas. The care areas of the FOV 306 are depicted as shaded areas, and include care areas 308, 309. While twelve areas are depicted in the FOV 306 of FIG. 3, a FOV can include any number of areas depending on the configuration of the e-beam system. After inspecting the care area 308 (and each of the care areas of the FOV 306), a beam deflection operation is performed before inspecting a next care area such as care area 309 begins. A care area can include multiple potential defects. In FIG. 3, the care area 308 includes potential defect 310. While five potential defects (depicted as black circles) including the potential defect 310 are depicted in the care area 308 within the FOV 306, a care area can include any number of potential defects depending on the characteristics of the care area.

Figure 4A:
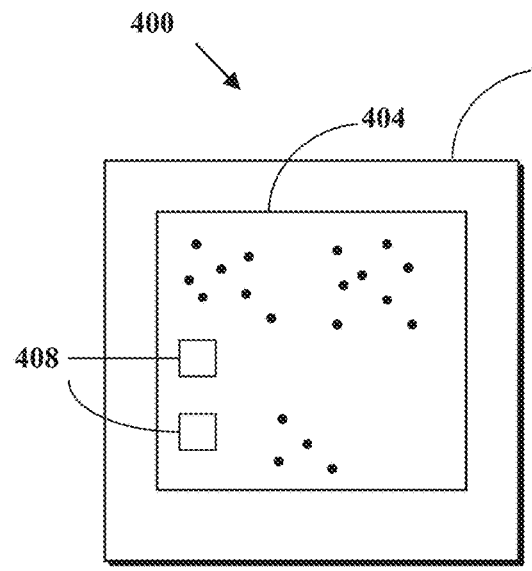
FIGS. 4A-4B are an example of a technique for determining care areas and care area size according to implementations of this disclosure.
Figure 4B:
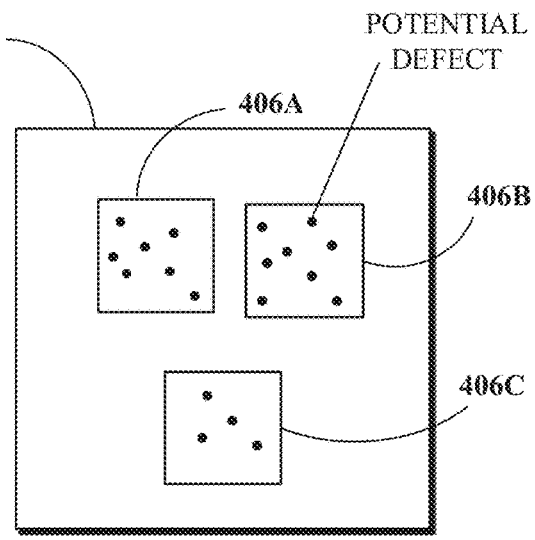

FIGS. 4A-4B are an example of a technique 400 for determining care areas and care area size according to implementations of this disclosure. FIGS. 4A and 4B both include an area 402 that represents an area of a wafer, such as the wafer 302 of FIG. 3, or an area of a die, such as the die 304 of FIG. 3, wherein the area 402 includes potential defects (depicted by the black circles). The same potential defects are illustrated in FIGS. 4A and 4B as black dots.

FIG. 4A illustrates one care area (care area 404) of the area 402 and at least one additional area 408. The at least one additional area 408 are white-space areas of the area 402 and within the care area 404 that are defect-free areas (no black dots present). The care area 404 includes all the potential defects of the area 402. An e-beam system can, based on a recipe file generated according to the care area 404, scan the care area 404 to provide defect detection. By way of example, if instructed to scan at a resolution of 3 nanometer (nm), then the e-beam system scans the care area 404 taking images of the requested pixel size until the whole care area is covered. As can be appreciated from FIG. 4A, the care area 404 can result in the e-beam system scanning and imaging areas which may not include defects (e.g., the at least one additional area 408). As such, the care area 404 is not an optimally sized frame since it results in the e-beam system unnecessarily imaging defect-free portions of the care area 404. The terms frame and care areas may be used interchangeably herein. Frame size can refer to the size of a care area.

Comparatively, FIG. 4B illustrates an optimized grouping of the potential defects (black dots) into multiple care areas with a reduced and optimized size (in comparison with the larger care area size of the frame 404), namely care areas 406A, 406B, 406C. As illustrated in FIG. 4B, a total area to be covered (i.e., a total scan area that is an area being scanned/inspected) by an e-beam system based on the three care areas 406A-406C is substantially smaller than a total area to be covered by the e-beam system based on the care area 404. As such, less time is required for the e-beam system to scan the care areas 406A-406C in comparison to the care area 404.

In FIG. 4B, the care areas 406A-406C are depicted as having the same width and height dimensions (i.e., frame sizes). This can be required, for example, when an e-beam system is pre-configured with a certain frame size prior to performing an inspection. In another implementation, the e-beam system is not so constrained and thus can perform inspections on care areas that have varying frame sizes. In this implementation, each frame size can be individually determined as the smallest frame size that includes a group of potential defects while minimizing the amount of white space or defect-free areas (such as the at least one additional area 408).

The frame size is determined by the pixel size of the e-beam system and the number of pixels in a scan direction (i.e., x and y direction). An inspection can be performed at a specified pixel size according to a specified resolution. For example, the number of pixels along a scan direction can be 128, 256, 512, 1024 pixels. Other number of pixels are possible. To determine the optimal frame size, some, all, or combinations of these frame sizes can be tested to determine one or more frame sizes that cover the potential defects and minimize the areas that do not include potential defects.

Figure 5A:
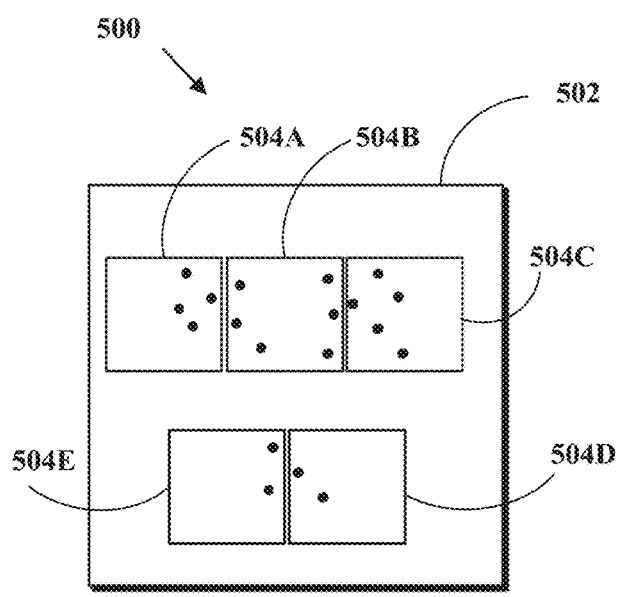
FIGS. 5A-5B are an example of a technique for arranging care areas and fields of view according to implementations of this disclosure.
Figure 5B:
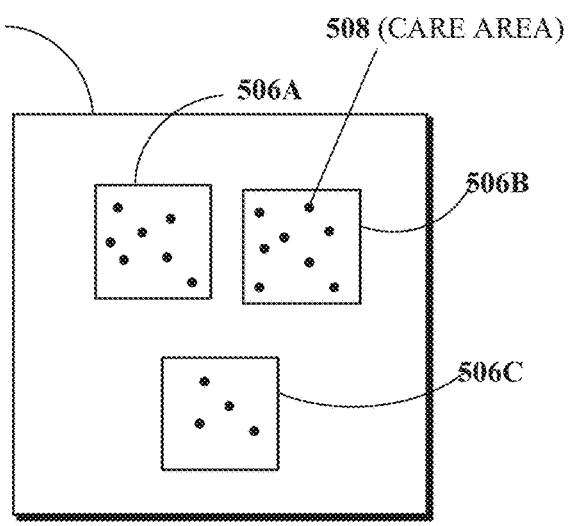

FIGS. 5A-5B are an example of a technique 500 for arranging care areas and fields of view according to implementations of this disclosure. In a first implementation, the black dots of FIGS. 5A-5B represent potential defects similar to the black dots of FIGS. 4A-4B. In the first implementation, the technique 500 of FIG. 5B illustrates an optimization of locations of the care areas or frames. In FIG. 5A, a location of each of care areas 504A, 504B, 504C, 504D, 504E is not optimized. In FIG. 5B, a location of each of care areas 506A, 506B, 506C are optimized because the care area adequately covers all of the potential defects while only utilizing three care areas whereas five care areas were utilized in FIG. 5A which is less efficient because it requires additional beam deflections during the inspection process and scans a larger area. In generating care areas for e-beam inspection, the size of the care area and the location of the care areas can be optimized. FIGS. 4A-4B illustrates an example of determining a size of the care area and FIG. 5 illustrates an example of optimizing the location of the care areas to minimize the area to be scanned by the e-beam system In a second implementation, and unlike FIGS. 4A-4B where each black dot represents a potential defect, the black dots of FIGS. 5A-5B represent care areas or frames. In the second implementation, the technique 500 of FIG. 5B illustrates an optimization of locations of the fields of view (FOVs). In FIG. 5A, a location of each of the FOVs 504A, 504B, 504C, 504D, 504E is not optimized. In FIG. 5B, a location of each of FOVs 506A, 506B, 506C are optimized because the FOVs adequately cover all of the care areas while only utilizing three FOVs whereas five FOVs were utilized in FIG. 5A which is less efficient because it requires additional stage movements during the inspection process.

For example, a care area 508 may represent any of the frames 406A, 406B, 406C of FIG. 4. As illustrated in FIG. 5A, locating the care areas into the fields of view (FOVs) 504A-504E results in at least five (5) stage movement operations (e.g., an initial stage movement operation to move the FOV 504A into the field of view of the e-beam system, followed by a second stage movement operation to move from the FOV 504A to the FOV 504B, followed by a third stage movement to move from the FOV 504B to the FOV 504C, followed by a fourth stage movement to move from the FOV 504C to the FOV 504D, followed by a fifth stage movement to move from the FOV 504D to the FOV 504E).

Comparatively, as illustrated in FIG. 5B, locating the care areas into the FOVs 506A-506C results in only three (3) stage movement operations (e.g., an initial stage movement operation to move the FOV 506A into the field of view of the e-beam system, followed by a second stage movement to move from the FOV 506A to the FOV 506B, followed by a third stage movement to move from the FOV 506B to the FOV 506C). By reducing the number of stage movement operations, the technique 500 provides an optimized and more efficient inspection of integrated circuits.

FIGS. 6A-6B are an example of a technique 600 for determining a path between fields of view according to implementations of this disclosure. FIGS. 6A and 6B both include an area 602 that depicts similar fields of view (FOVs) 604A, 604B, 604C. In FIG. 6A, the FOV 604A is scanned first, followed by a scan of the FOV 604C, followed by a scan of the FOV 604B via a first scanning order as denoted by arrows 1A and 1B. A path is formed via the first scanning order as the total path required for the stage movement operations that a high-resolution inspection system must conduct during the course of the inspection process.

Comparatively, in FIG. 6B, the FOV 604A is again scanned first, but this is followed by a scan of the FOV 604B, followed by a scan of the FOV 604C via a second scanning order as denoted by arrows 2A and 2B. A path is formed via the second scanning order as the total path required for the stage movement operations that a high-resolution inspection system must conduct during the course of the inspection process (similar to FIG. 6A). The path of FIG. 6B depicts a more optimal path because it is shorter than the path of FIG. 6A. Therefore, the second scanning order which provides for a scan of the FOV 604A, followed by a scan of the FOV 604B, followed by a scan of the FOV 604C is preferable over the first scanning order. By optimizing the path distance, the number of time-consuming stage movement operations can be reduced thereby resulting in a more efficient inspection process.

In an implementation, a path between the fields of view (such as the path of FIG. 6A and the path of FIG. 6B) can be determined, for example, by finding a shortest path or shortest distance between the fields of view. Finding the shortest path can be performed using any variant of algorithms that solve the traveling salesman problem. Any number of heuristics can be applied including, without limitation, the nearest neighbor heuristic, greedy heuristics, insertion heuristics, or any other heuristics. For example, for a next FOV to be inspected, a nearest neighbor heuristic can be used which results in the inspection of the nearest FOV neighbor of a current FOV under inspection where the nearest FOV has not yet been inspected. In an implementation, an operator (e.g., a user) can specify rules (e.g., via configuration or programmatically) regarding the FOV inspection process. For example, the operator can specify a rule indicating which FOV is to be inspected first, which FOV is to be inspected before another FOV, specific orders that the FOVs should be inspected, and so on. FIGS. 6A-6B depict the top-left corners of FOVs as representative points of a FOV. However, other representative points in other areas of the FOVs (e.g., top-right corners, bottom-left corners, bottom-right corners) can be used.

FIG. 7 is an example of a technique 700 for determining a shortest path between fields of view according to implementations of this disclosure. FIG. 7 illustrates five FOVs, FOVs 702-710 (denoted with numbers 1, 2, 3, 4, 5), as a fully connected undirected graph of the FOVs 702-710. A connection between every two FOVs (or each pair of FOVs) is created. For example, the FOV 702 is connected to each of the FOV 704, 706, 708, and 710. Each connection is assigned a metric. FIG. 7 includes metrics $l_{12}, l_{13}, l_{14}, l_{15}, l_{23}, l_{24}, l_{25}, l_{34}, l_{35}, l_{45}$. For example, the connection between the FOV 702 and the FOV 708 is assigned the metric $l_{14}$. The metric can be, for example, the spatial (i.e., Euclidean) distance between corresponding points in the two FOVs (e.g., FOV 702 and 708). The spatial distances can be distances derived from design GDS files associated with the integrated circuits or dies being inspected.

In another example, after scanning care areas in one FOV and storing all the SEM images based on the scan, it can be preferable to inspect a particular FOV before others while the computer memory holds at least some of the SEM images from the one FOV (e.g., before the SEM images of the one FOV are released from the computer memory so that SEM images from future scans can be stored). In such a case, the metric can be a metric other than, or an additional metric to, the spatial distance. The similarities between FOVs can be used to determine the metric.

In an implementation of defect detection, SEM images that include the same or similar patterns are considered (i.e., analyzed) together (i.e., during a same defect detection operation). As such, and for optimal performance of defect detection, these SEM images need to be readily accessible such as by storing them in a memory, such as the memory 104 of FIG. 1. The memory has finite capacity and can store a limited number of SEM images, it is desirable to scan a second FOV immediately after scanning a first FOV when the second FOV contains the same or similar patterns as the first FOV. Otherwise, scanning a third FOV between the first FOV and the second FOV may result in removing the SEM images of the first FOV from memory when the second FOV in scanned. As such, each connection between two FOVs, as described above with respect to FIG. 7, can be assigned a metric that is indicative of the similarity between the two FOVs of the connection. The value of the metric can be inversely proportional to the degree of similarity. When two FOVs are very similar, then the metric can be set to a small value. In an implementation, the degree of similarity and the spatial distance can be combined, such as via multiplication, to set the metric on the connection between two FOVs. In another implementation, other metrics can be used to determine the metric.

A shortest path between each of the FOVs 702-710 can be determined by the technique 700 utilizing algorithms for solving the traveling salesman problem. Any number of heuristics can be applied including, without limitation, the nearest neighbor heuristic, greedy heuristics, insertion heuristics, or any other heuristics.

Figure 8:
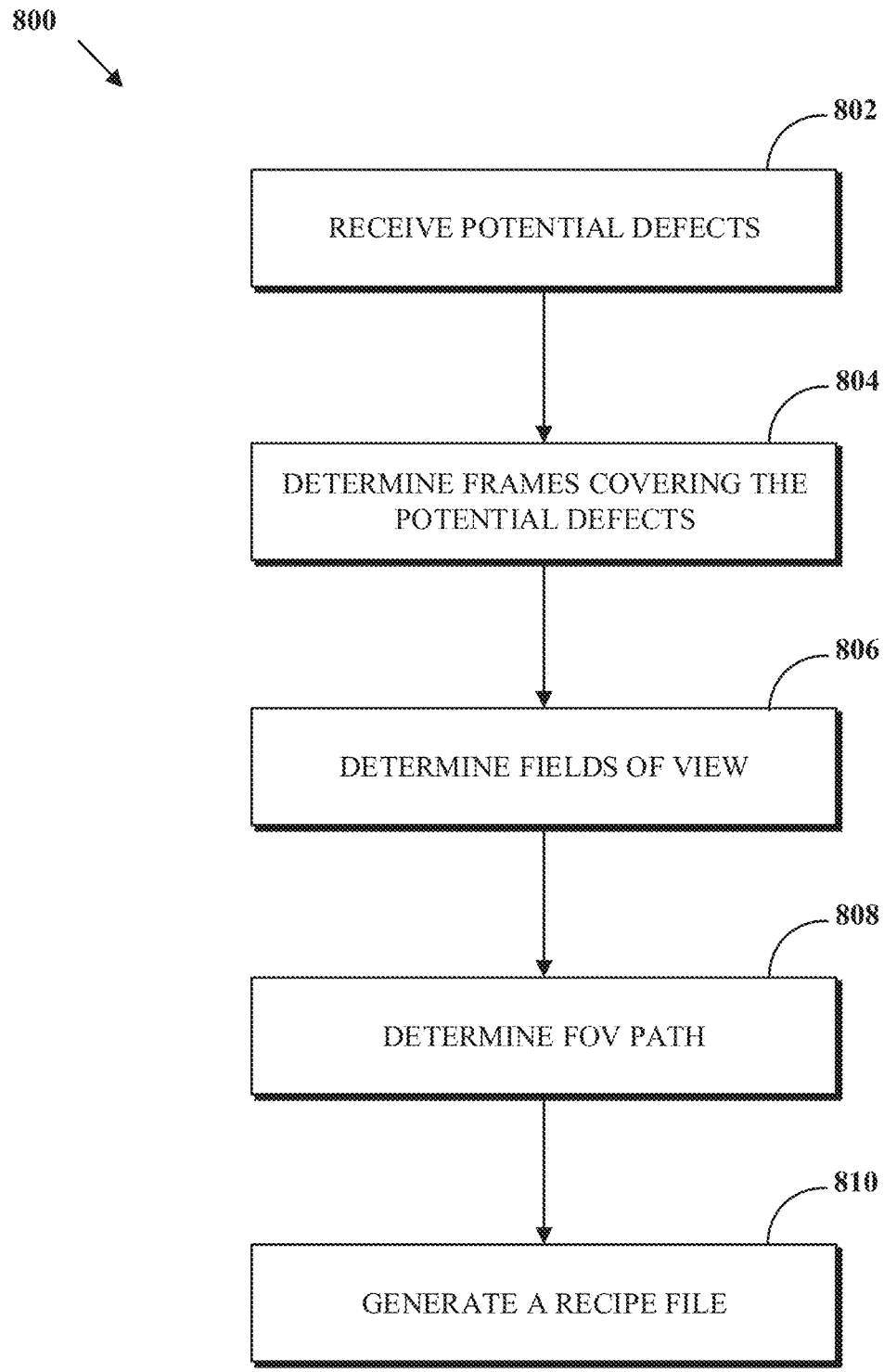
FIG. 8 is an example of a technique for optimizing generated care areas to accelerate guided charged particle beam inspection according to implementations of this disclosure.

FIG. 8 is an example of a technique 800 for optimizing generated care areas to accelerate guided charged particle beam inspection according to implementations of this disclosure. The technique 800 minimizes the stage movement (or stage movement operations) of a high-resolution inspection system (e.g., an e-beam system). The technique 800 can be implemented, for example, as a software program that can be executed by computing devices such as the system 100 of FIG. 1. The software program can include machine-readable instructions that can be stored in a memory such as the storage 106 or the memory 104, and that can be executed by a processor, such as the first processing unit 102A or the second processing unit 102B, to cause the system 100 to perform the technique 800.

At operation 802, a list of potential defects is received. "Receive" means any way that the list of potential defects becomes accessible or available to the technique 800 so that the technique 800 can carry out at least some of its steps. In an implementation, the technique 800 can include steps that generate or aid in the generating of the list of potential defects. The list of potential defects may be generated based, for example, on prior knowledge, such as by a process engineer, a design engineer, or the like of manufacturing processes or the circuit designs under manufacture or inspection, simulations of the manufacturing process under varying process conditions, or any combination thereof. The list of potential defects may be generated based on additional or other ways. For example, the list of potential defects can be received in a recipe file. That is, the technique 800 may receive, via the operation 802, a list of care areas which are indicative of the potential defects. In this example, considering care areas are frames, the technique 800 could bypass operation 804 described below.

The received list of potential defects may not be optimally organized (e.g., ordered). "Optimally organized" means that the list of potential defects can be scanned by an e-beam system based on as few as possible (or a minimal number of) care areas and/or FOVs, or a combination thereof such that stage movement (or stage movement operations) of the e-beam system is minimized. "As few as possible" does not necessarily mean "fewest possible;" rather "as few as possible" can depend, for example, on the available resources, such as computing resources and time.

At operation 804, frames covering the potential defects are determined. Each frame includes one or more potential defects and each frame is the same as a care area. Each potential defect is included in only one frame. Determining the frames covering the potential defects can be based on analyzing the spatial relationships between the potential defects. In some implementations, determining the frames can also include optimizing the size of the frame. An optimal frame size can be a frame size that minimizes a total area of a die or a wafer that includes all the potential defects. In an implementation, the total area of the die or the wafer is calculated by determining a frame size and multiplying the frame size by a number of frames necessary to cover all of the potential defects received by the operation 802. The frames can be determined using any known technique, such as clustering techniques. The clustering technique can leverage the spatial relationships between the potential defects. The potential defects are clustered into as few clusters are possible such that each cluster can be covered by a care area. The list of potential defects can then be arranged based on the determined frames. FIGS. 4A-4B described above further illustrate determining frames and frame sizes in accordance with the step 804. In an implementation, different number of pixels (e.g., 128, 256, 512, and 1024) in each scan direction are evaluated in order to determine which combination of number of pixels results in covering the potential defects and minimizing the defect-free areas that are scanned.

At operation 806, the fields of view (FOVs) covering the frames (i.e., the care areas) are determined. The spatial relationships between the determined frames are analyzed to determine the FOVs. The frames are grouped based on the spatial relationships between the frames such that frames that can be covered in the same FOV are included in one group. Grouping the care areas into FOVs can be determined using any known techniques, such as clustering techniques. The care areas are clustered into as few clusters are possible such that each cluster can be covered by a FOV. The frames or care areas of each group can be grouped sequentially. Scanning the frames or care areas of a single group involves electron beam deflection operations (rather than stage movement operations). As such, grouping the care areas can further reduce the scan time because the scanning time involved with beam deflection operations is less than the scanning time involved with stage movement operations. FIGS. 5A-5B described above further illustrate determining fields of view in accordance with the operation 806. When an e-beam system is configured to use different FOV sizes (as opposed to a single size for each FOV), the technique 800 can also determine, via the operation 806, varying FOV sizes that are optimized to further improve the inspection process. In an implementation, each FOV size can be determined to be the smallest size that can include a group of care areas.

At operation 808, a path between the determined fields of view that minimizes stage movement of the e-beam system is determined. FIGS. 6A-6B and FIG. 7 described above further illustrate determining a path between the fields of view in accordance with the step 808. At operation 810, a recipe file of the frames or care areas that are optimized to reduce stage movement operations is generated. Each care area of the recipe file corresponds to a frame and is an entry within the recipe file. The care areas are ordered in the recipe file based on the results of the steps 804, 806, and 808. The care areas are written to the recipe contiguously so that the care areas are inspected sequentially by the e-beam system resulting in a more efficient inspection process of the integrated circuits.

Figure 9:
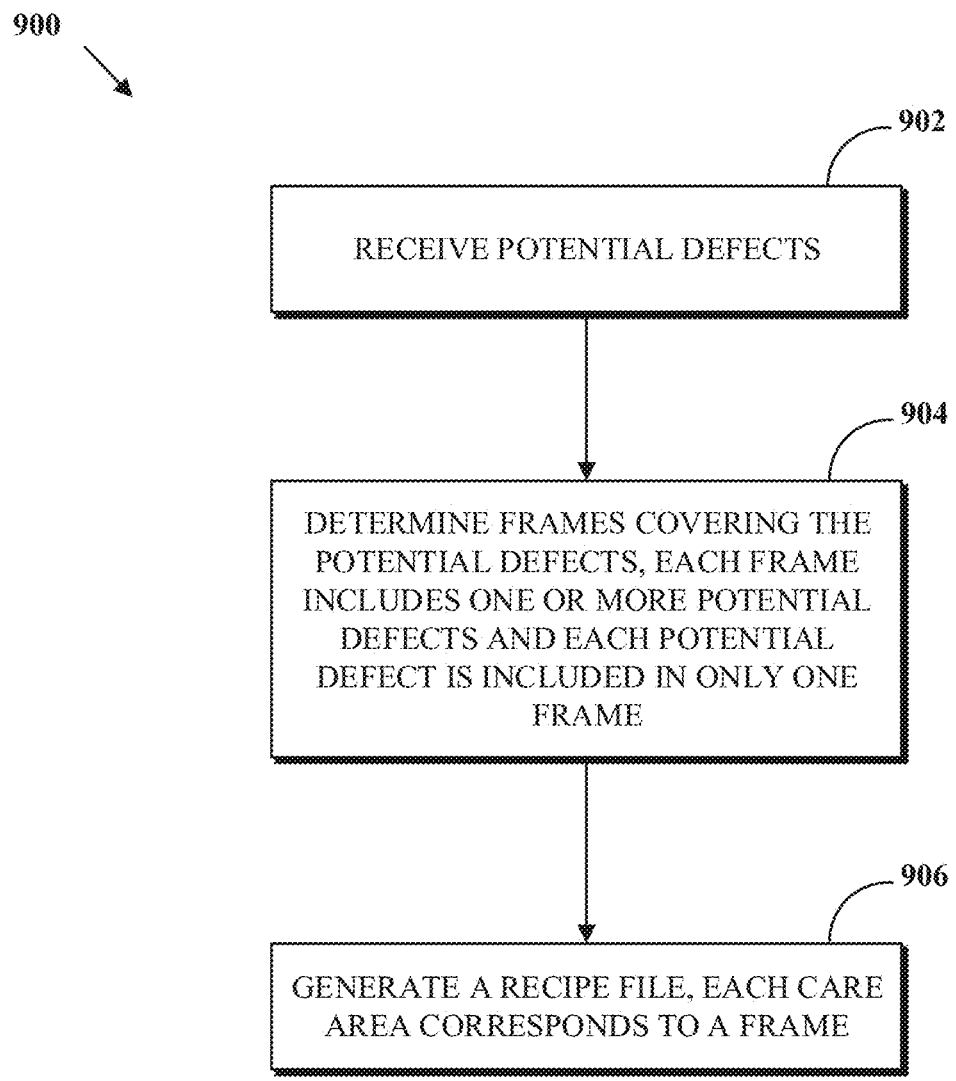
FIG. 9 is an example of a technique for minimizing stage movement of a high-resolution inspection system according to implementations of this disclosure.

FIG. 9 is an example of a technique 900 for minimizing stage movement of a high-resolution inspection system according to implementations of this disclosure. The technique 900 can be implemented, for example, as a software program that can be executed by computing devices such as the system 100 of FIG. 1. The software program can include machine-readable instructions that can be stored in a memory such as the storage 106 or the memory 104, and that can be executed by a processor, such as the first processing unit 102A or the second processing unit 102B, to cause the system 100 to perform the technique 900. The technique 900 can implement teachings consistent with the descriptions of FIGS. 1-7.

The technique 900 includes an operation 902 for receiving potential defects, an operation 904 for determining frames covering the potential defects, and an operation 906 for generating a recipe file of care areas such that each care area corresponds to a frame. Each frame includes one or more potential defects and each potential defect is included in only one frame. The technique 900 can perform the operation 902 as described with respect to the operation 802 of FIG. 8. The technique 900 can perform the operation 904 as described with respect to the operation 804 of FIG. 8. At the operation 906, the technique 900 orders the care areas in the recipe file based on the results of the operation 904.

In some implementations, the technique 900 can include steps for determining a frame size that minimizes a total area of the frames to be inspected by the e-beam system. The frame size can be based on spatial relationships of the potential defects. The care areas of the recipe file can be ordered such that care areas within a field of view are grouped. The technique 900 can also include, as described with respect to the operation 806 of FIG. 8, determining fields of view covering the care areas and, as described with respect to the operation 808 of FIG. 8, determining a path between the fields of view that minimizes stage movement of the e-beam system. The care areas of the recipe file can be ordered based on the path between the fields of view. In some implementations, determining the path between the fields of view includes assigning a respective weight between each of the field of views and determining a shortest distance between the fields of view based on the respective weights. In some implementations, the technique 900 can include co-optimizing the frame size, the care areas, and the fields of view. In some implementations, the technique 900 can include co-optimizing the frame size, the care areas, the fields of view, and the path between the fields of view.

Figure 10:
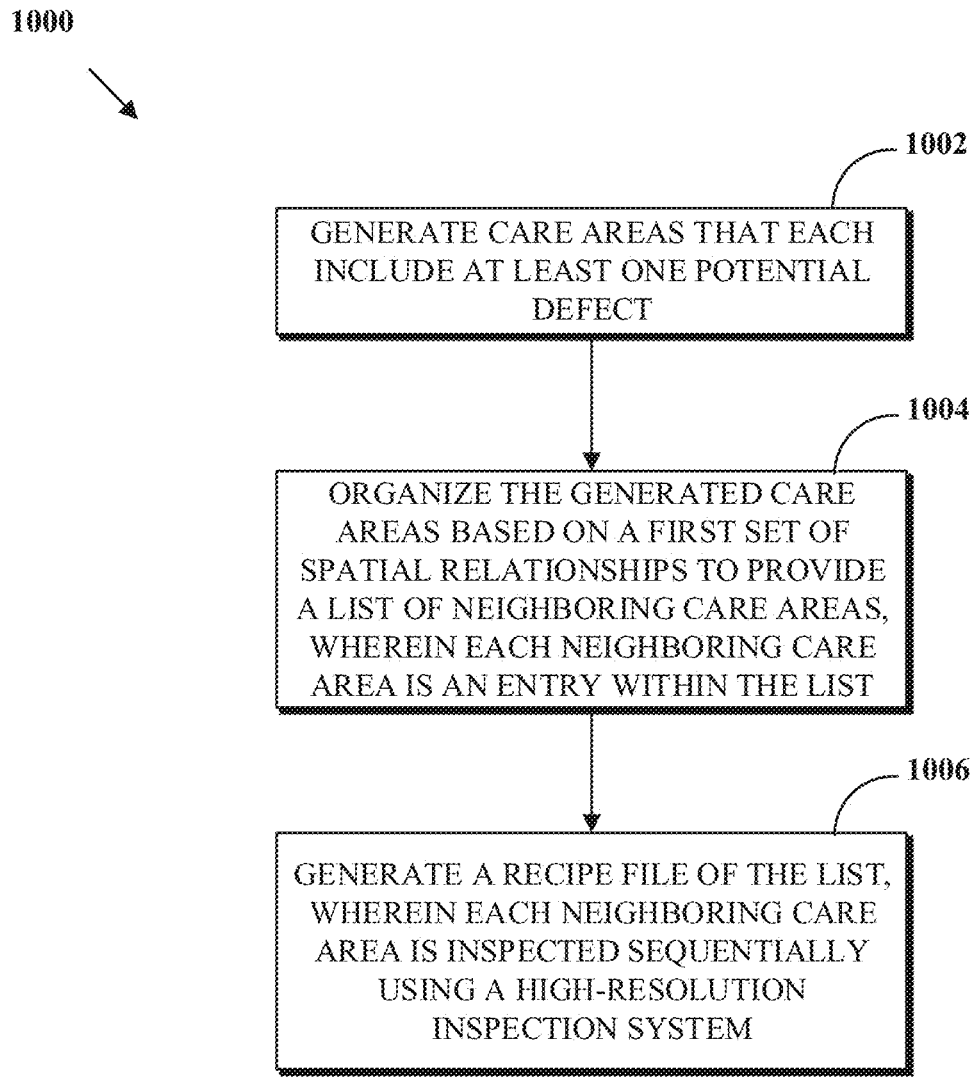
FIG. 10 is a method for inspecting integrated circuits in accordance with an implementation of this disclosure.

FIG. 10 is method 1000 for inspecting integrated circuits in accordance with an implementation of this disclosure. The method 1000 can be implemented, for example, as a software program that can be executed by computing devices such as system 100 of FIG. 1. The software program can include machine-readable instructions that can be stored in a memory such as the storage 106 or the memory 104, and that can be executed by a processor, such as the first processing unit 102A or the second processing unit 102B, to cause the system 100 to perform the method 1000. The method 1000 can implement teachings consistent with the descriptions of FIGS. 1-8.

At step 1002, the method 1000 generates care areas that each include at least one potential defect. The method 1000 can perform the step 1002 in accordance to the steps 802, 804 of FIG. 8 or the step 902 of FIG. 9. At step 1004, the method 1000 organizes the generated care areas based on a first set of spatial relationships to provide a list of neighboring care areas. Each neighboring care area is an entry within the list of neighboring care areas. The method 1000 can perform the step 1004 in accordance with the step 806 of FIG. 8. At step 1006, the method 1000 generates a recipe file of the list. Each neighboring care area is inspected sequentially using a high-resolution inspection system, such as an e-beam system. The method 1000 can perform the step 1006 in accordance with the step 810 of FIG. 8 and the step 906 of FIG. 9.

In some implementations of the method 1000, the generating care areas that each includes at least one potential defect includes generating potential defects, determining a second set of spatial relationships between the potential defects, and grouping the potential defects within frames using the second set of spatial relationships such that each frame corresponds to one of the generated care areas. The method 1000 can generate potential defects in accordance with the steps 802 of FIG. 8 and the step 902 of FIG. 9. The potential defects can be generated using any of hot spot prediction techniques or predetermined information (e.g., prior knowledge). The method 1000 can group the potential defects within frames (or care areas) using the second set of spatial relationships in accordance with the step 804 of FIG. 8 and the step 904 of FIG. 9. In some implementations, the method 1000 can determine a frame size of the frames to minimize a total area of the frames using the second set of spatial relationships.

In some implementations, organizing the care areas based on a first set of spatial relationships to provide a list of neighboring care areas includes determining the first set of spatial relationships between the generated care areas, grouping the generated care areas within fields of view using the first set of spatial relationships such that each field of view includes at least one of the generated care areas, and ordering the fields of view to provide the list of neighboring care areas.

In some implementations, the grouping the generated care areas within fields of view using the first set of spatial relationships includes determining a minimum number of fields of view that include the generated care areas using the first set of spatial relationships. In some implementations of the method 1000, the at least one of the generated care areas within each field of view is written to the recipe file contiguously.

In some implementations, the method 1000 includes determining a third set of spatial relationships between the fields of view, and determining a path between the fields of view using the third set of spatial relationships such that the path minimizes stage movement of the high-resolution inspection system. Determining a path between the fields of view can include assigning a respective weight between each pair of the fields of view and determining a shortest distance between the fields of view based on the respective weights.

For simplicity of explanation, the techniques 800, 900, and the method 1000 are depicted and described as a series of steps. However, steps in accordance with this disclosure can occur in various orders, concurrently, and/or iteratively. For example, the steps 804 and 806 may be performed together. This is known as co-optimization of the frames, frame sizes, and the fields of view. For example, the steps 804, 806, and 808 may be performed together resulting in co-optimization of the frames, frame sizes, the fields of view, and the path between the fields of view. The level of co-optimization to be performed, if any, may depend on available resources (e.g., time) to perform the technique 800 or the technique 900. As can be appreciated, as the number of variables to be optimized (e.g., number of frames, frame size, number of fields of view, a path between fields of view) increases, the time required for perform the optimization also increases. Under limited resources, for example, some or no co-optimization is performed.

Additionally, steps in accordance with this disclosure may occur with other steps not presented and described herein. For example, the techniques 800, 900, and the method 1000 can receive configuration parameters. The configuration parameters may be received from a user, such as, for example, a manufacturing engineer. For example, the user may specify that the size of the care area is not to be optimized. As such, at least some aspects of the operation 804, the operation 904, or the step 1002, as described, are not performed. Furthermore, not all illustrated steps may be required to implement a technique in accordance with the disclosed subject matter.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The above-described implementations have been described in order to allow easy understanding of the present disclosure and do not limit the present disclosure. To the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for inspecting potential defects in integrated circuits using a high-resolution inspection system that performs only beam deflection when scanning within any field of view (FOV) and performs stage movement when transitioning to scan within another FOV, the method comprising:
    generating care areas that each includes at least one potential defect of the potential defects, wherein generating the care areas comprising:
        grouping the potential defects into the care areas so as to minimize a total area of the care areas that includes all the potential defects;
    grouping the care areas, using a first set of spatial distances amongst the care areas, into fields of view (FOVs), wherein each FOV includes a respective group of the care areas such that
    a number of the FOVs is an as few as possible number of FOVs based on available resources;
    determining a set of spatial relationships between the FOVs; and
    determining a path between the FOVs using the set of spatial relationships, wherein the path minimizes stage movement of the high-resolution inspection system; and
    generating a recipe file based on the grouping the care areas and the path between the FOVs.

2. The method of claim 1, wherein generating care areas that each includes at least one potential defect comprises:
    determining a second set of spatial relationships between potential defects; and
    grouping the potential defects within the care areas using the second set of spatial relationships.

3. The method of claim 1, wherein the respective group of the care areas within is written to the recipe file contiguously.

4. The method of claim 1, wherein determining the path between the FOVs comprises:
    assigning a respective weight between each pair of the fields of view; and
    determining a shortest distance between the fields of view based on the respective weights.

5. A system for inspecting integrated circuits using a high-resolution inspection system that performs only beam deflection when scanning within any field of view (FOV) and performs stage movement when transitioning to scan within another FOV, the system comprising:
    a processor; and
    a memory coupled to the processor, wherein the memory includes instructions executable by the processor to:
        generate care areas that each includes at least one potential defect;
        cluster the care areas, based on a first set of spatial distances amongst the care areas, into fields of view (FOVs), each FOV comprising a respective groups of the care areas, wherein a spatial distance amongst a first care area and a second care area is a Euclidean distance between corresponding points of the first care area and the second care area;
        determine a set of spatial relationships between the FOVs; and
        determine a path between the FOVs using the set of spatial relationships, wherein the path minimizes stage movement of the high-resolution inspection system; and
        generate a recipe file based on the care areas and the path.

6. The system of claim 5, wherein to generate care areas that each includes at least one potential defect comprises to:
    determine a second set of spatial relationships between potential defects; and
    group the potential defects within the care areas using the second set of spatial relationships.

7. The system of claim 6, wherein to generate care areas that each includes at least one potential defect comprises:
    determine, for the care areas and using a second set of spatial relationships, respective care area sizes that minimize a total area of the care areas.

8. The system of claim 5, wherein the respective group of the care areas is written to the recipe file contiguously.

9. A non-transitory computer readable storage medium for inspecting integrated circuits using a high-resolution inspection system that performs only beam deflection when scanning within any field of view (FOV) and performs stage movement when transitioning to scan within another FOV, comprising executable instructions that, when executed by a processor, facilitate performance of operations, comprising:
    generating care areas that each includes at least one potential defect;
    clustering, based on a first set of spatial distances amongst the care areas, the care areas into groups of care areas such that each group of care areas is covered by a field of view (FOV) of the high-resolution inspection system, wherein a spatial distance amongst a first care area and a second care area is a Euclidean distance between corresponding points of the first care area and the second care area, and wherein the clustering resulting in a plurality of fields of view (FOVs);

determining a path between the plurality of FOVs using the set of spatial relationships, wherein the path minimizes stage movement of the high-resolution inspection system; and generating a recipe file based on the clustering and the path.

10. The non-transitory computer readable storage medium of claim 9, wherein the operations for generating care areas that each includes at least one potential defect comprise:

generating potential defects;

determining a second set of spatial relationships between potential defects; and grouping the potential defects within the care areas using the second set of spatial relationships.

11. The non-transitory computer readable storage medium of claim 10, wherein the operations for generating care areas that each includes at least one potential defect comprise:

determining, for the care areas and using a second set of spatial relationships, respective care area sizes that minimize a total area of the care areas.

12. The non-transitory computer readable storage medium of claim 9, wherein the at least one of the care areas within each field of view is written to the recipe file contiguously.

\* \* \* \* \*